Oct. 9, 1956
J. H. ELLIS
2,765,846
TIRE GROOVING MACHINE
Filed June 19, 1948.
2 Sheets-Sheet 1
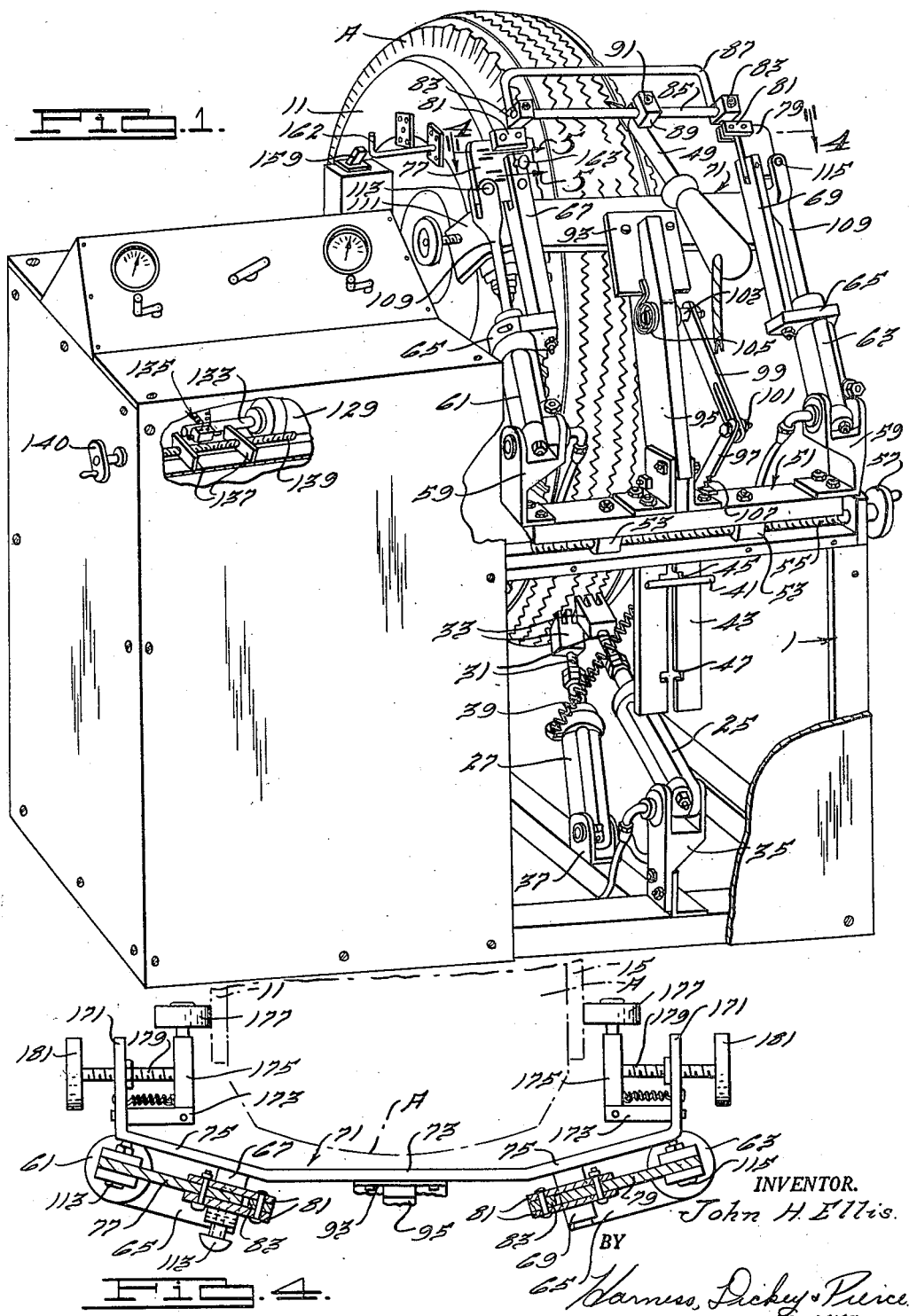
INVENTOR.
John H. Ellis.
BY
Harness, Dickey & Pierce.
ATTORNEYS.

Oct. 9, 1956
J. H. ELLIS
2,765,846
TIRE GROOVING MACHINE
Filed June 19, 1948
2 Sheets-Sheet 2
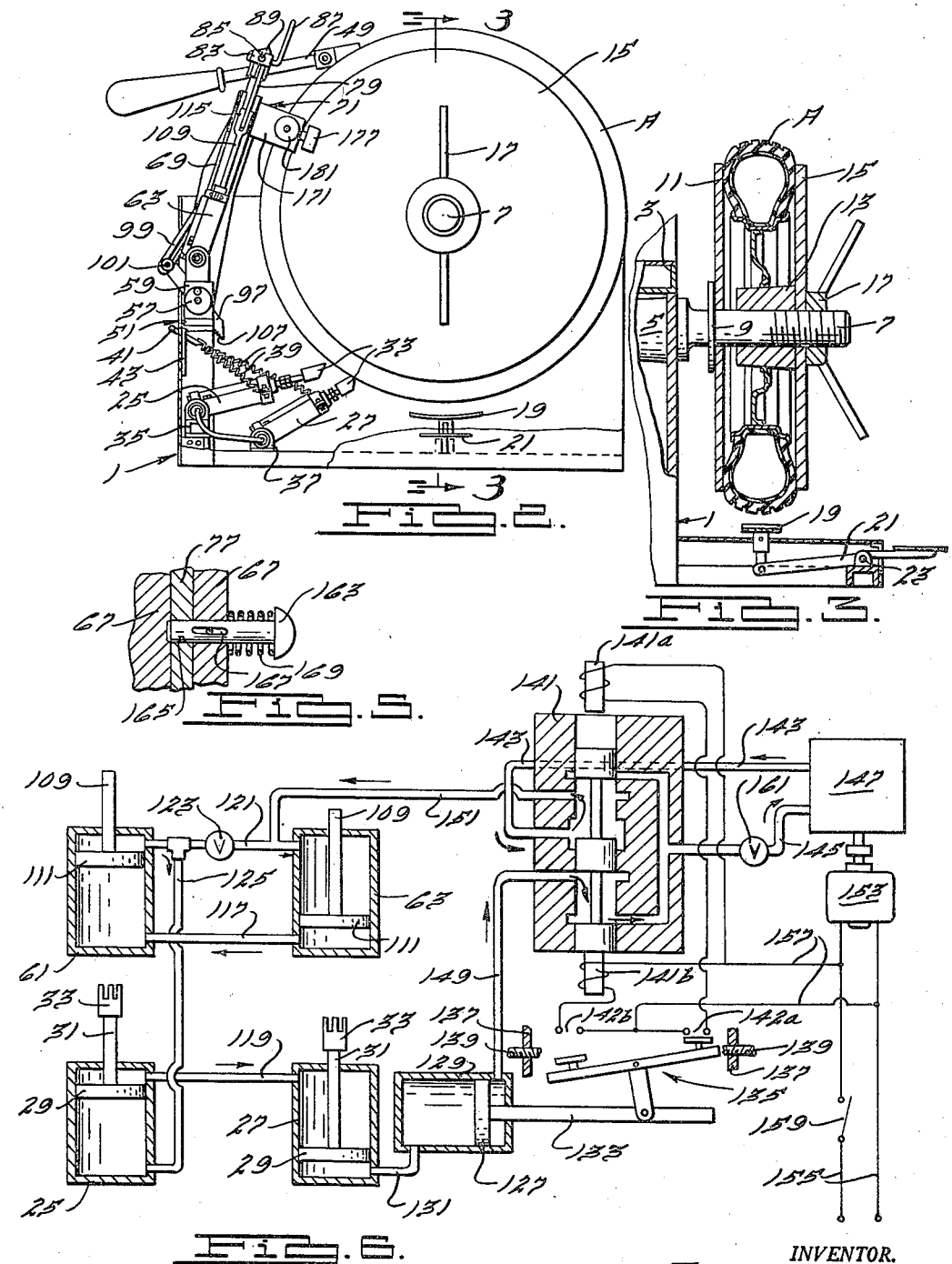
INVENTOR.
John H Ellis
BY
Harness, Dickey & Pierce
ATTORNEYS.

United States Patent Office 2,765,846
Patented Oct. 9, 1956

2,765,846

TIRE GROOVING MACHINE

John H. Ellis, Detroit, Mich.

Application June 19, 1948, Serial No. 34,123

8 Claims. (Cl. 164—10.2)

This invention relates to mechanical means for grooving tires.

As is known, peripheral grooves are desirable in tires for optimum performance. These grooves are of many shapes and are formed in the tires by molding during the manufacture thereof. During subsequent use of a tire, its outer periphery may be worn down until the grooves disappear leaving the tire "bald." Since there still may be much useful rubber on the periphery of a bald tire, it is the practice to regroove or recut it so that from a functional standpoint at least it is practically as good as new.

In the past tires have been recut by hand. Insofar as the present inventor is aware there has never been any successful attempt to provide mechanical means for grooving tires. Nevertheless there is an evident need for such means in order to decrease the time and expense of recutting tires and to improve the quality of the work performed. It is thus the broad object of this invention to provide a machine for grooving tires.

Various features of the invention will be described in connection with the accompanying drawings showing a preferred embodiment in which Fig. 1 is a perspective view from the front of a tire grooving machine constructed in accordance with the principles of the invention;

Fig. 2 is a side elevation of the machine shown in Fig. 1;

Fig. 3 is a section taken along line 3—3 of Fig. 2 to show the tire holding mechanism;

Fig. 4 is a section taken along the line 4—4 of Fig. 1;

Fig. 5 is a section taken along the line 5—5 of Fig. 1; and

Fig. 6 is a diagrammatic view showing electrical and hydraulic circuits for operating the machine automatically.

As illustrated in the drawings, the tire grooving machine has a frame 1 of any suitable construction. Tire supporting means of a desired type may be provided and may include a vertical support member 3 on the frame 1 (Fig. 3) having a bearing box 5 for rotatably supporting in fixed axial position a cantilever axle 7. The axle 7 has a fixed radial flange 9 and abutting this is a side plate 11 which is of slightly less diameter than the tire to be grooved. The tire A to be grooved, which is inflated and on its rim, is mounted on the axle 7 against the plate 11 and wedged in place by means of a conical member 13 which slides on the axle 7. An outer side plate 15 is forced against the other side of the tire A by means of a large wing nut 17 threaded on the axle 7. The mounting of the tire A on the axle 7 may be facilitated by means of a vertically slidable tire lifter 19 beneath the tire which is actuated by means of a foot lever 21 pivoted thereto and to the frame 1 as shown at 23.

Means are provided for rotating the tire A and, in the embodiment illustrated, this preferably applies intermittent rotative forces to the tire. This means comprises a pair of hydraulic kicker cylinders 25 and 27, respectively. Each cylinder has the usual piston 29 (Fig. 6) with a telescopic rod 31 terminating in a pointed kicker block 33 adapted to engage the periphery of the tire A. The cylinders 25 and 27 are horizontally pivoted (Fig. 1) at their ends to brackets 35 and 37, respectively, which are affixed to the frame 1 below and forwardly of the tire A. The forward ends of the cylinders are raised by means of springs 39 which are connected thereto so that the kicker blocks 33 may engage the tire A. The springs 39 are inclined upwardly to a handle 41 to which they are suitably connected. The handle 41 is slidable in a slotted vertical locking plate 43 attached to the frame 1 (Fig. 1). This plate has a horizontal upper slot 45 which is adapted to hold the handle 41 in a position such that the kicker blocks 33 strike the tire A and a lower slot 47 which is adapted to hold the handle 41 in a position such that the kicker blocks 33 do not strike or engage the tire A and are thus inoperative.

If desired, one or more electrically heated tire cutters 49 of the type now used for manual recutting may be used as grooving tools in this machine. Means are provided for holding the cutters 49 in yieldable engagement with the periphery of the tire A and for manually and automatically moving the cutters in a direction substantially parallel to the tire surface being grooved, i. e., in a substantially lateral or transverse direction.

For the purpose of manually moving the cutters, a carriage bar 51 may be provided (Fig. 1). The carriage bar 51 has lower support blocks 53 slidable on the frame 1, through which threadably extends a transverse lead screw 55 which is journaled at its ends in upstanding portions of the frame 1 and has a handle 57 at one end whereby it may be manually rotated. The cutters 49 are attached to the carriage bar 51 by means to be presently described; hence, rotation of the lead screw 55 which results in axial movement thereon of the carriage bar 51 causes transverse or lateral movement of the cutters.

The carriage bar 51 has affixed thereto the transversely spaced, upstanding brackets 59. The hydraulic cylinders 61 and 63, which are desirably but not necessarily of the same construction as the cylinders 25 and 27, are pivotally connected at their ends to the brackets 59 and serve as means to connect the cutters to the carriage bar 51 and to apply forces to the cutters for moving them transversely of the bar 51 and the tire A.

In order to connect the cutters 49 to the carriage bar 51 and support them thereon, the cylinders 61 and 63 are upwardly inclined and have transverse flanges 65 near one end to which are fixed longitudinal arms 67 and 69, respectively, which arms extend parallel to the axes of the cylinders. The arms 67 and 69 are welded or otherwise fixedly connected to and interconnected by a transverse crosshead 71, a member which may also assist in centering the tire A as will be described hereinafter. The central portion 73 of the crosshead 71 is preferably plane and parallel to the axis of the tire A whereas the outer portions 75, to which the arms 67 and 69 are affixed, are preferably inclined to the tire axis, as shown in Fig. 4, so that their slope conforms roughly to the curvature of the peripheral surface of tire A. The outermost ends of the arms 67 and 69 are slotted or bifurcated in planes parallel to the portions 75 and pivotally receive therein the rocker plates 77 and 79, respectively, which thus are capable of pivotal movement roughly parallel to the adjacent surface of the tire A. Pivotally connected to the rocker plates 77 and 79 on the top and undersides thereof are the sets of transverse parallel link bars 81 which receive therebetween longitudinal tongues depending from the spaced clamp blocks 83. The blocks 83 are interconnected by means of a transverse rod 85 clamped therein and, if desired, by the longitudinal legs of a generally U-shaped rod 87. It will be recognized that this structure is connected to the carriage bar 51 for pivotal movement relative thereto in the plane of the tire A and for transverse movement therewith under the influence of lead screw 55. The cutter or cutters 49 are therefore desirably attached to the rod 85 as by a clamp block 89 which is slidable along the rod but capable of being locked in fixed position thereon by a clamp screw 91.

As observed in Fig. 2, the kickers 33 and the cutter 49 are on the same side of a vertical plane through the tire axis but on opposite sides of a horizontal plane therethrough. The kickers thus rotate the tire A into the tool 49 to provide a force urging it out of a groove which it may be cutting. This force is resisted to some extent by the weight of the structure pivoted to the carriage bar 51 which provides a downward component of force on the tool 49 but it is desirable to supplement this by a yieldable force urging the tool into engagement with the tire periphery. For this purpose, as well as to fixedly center the crosshead 71 with respect to the carriage bar 51, the crosshead 71 may have affixed thereto a plate 93 having a longitudinal guide slot therein in which is fitted the nose of an upstanding guide bar 95 which is fixed to the carriage bar 51. Converging links 97 and 99 are pivoted together at 101 and the upper link 99 has a fixed transverse pin 103 which is journaled in the guide bar 95 slightly below the end of the plate 93. The inner end of a spiral spring 105 is fixed to the pin 103 and the outer end of this spring bears downwardly on the plate 93. The lower link 97 has a series of notches 107 therein by means of which it may be connected to a projecting lip or edge of the carriage bar 51 to transmit forces thereto. It will be apparent from Fig. 1 that the link 99 acts as a lever arm to provide means to vary the force with which spring 105, acting through plate 93, urges the cutter 49 into contact with the periphery of tire A and that the notches in link 97 provide means to control the position of lever 99 and to transmit reaction forces to the carriage bar 51.

In order to produce grooves of a pattern other than purely circular, such, for example, as the zig-zag grooves shown in Fig. 1, it is desirable to provide an automatic transverse feed for the cutter 49 in addition to the manual transverse feed described in connection with lead screw 55. For this purpose, the ends of the telescopic rods 109 depending from pistons 111 in the cylinders 61 and 63 are pivotally connected to the outer edges of the rocker plates 77 and 79 as shown at 113 and 115, respectively. Reciprocating movement of the rods 109 thus pivots the plates about their fixed pivotal connections with the arms 67 and 69 so that the link bars 81 attached thereto have a transverse motion which they transmit through the clamp blocks 83 to the rod 85 and cutter 49.

It will be recognized that it is necessary to synchronize the particular cylinder arrangement illustrated so that the rods 109 move simultaneously in opposite directions. It may also be desirable to synchronize the cylinders 61 and 63 with the kicker cylinders 25 and 27 so that all forces are applied simultaneously. For these purposes, the cylinders may be connected together and with a reversing mechanism in a manner such as that illustrated in Fig. 6, though it will be recognized that this mechanism, as well as the cylinders, are merely illustrative of means whereby the desired relative movement between the tire A and tool 49 may be achieved and that other specific devices and circuits are within the scope of the invention.

As shown in Fig. 6, the cylinders are of the same capacity and the undersides of the pistons 111 are in fluid communication through the conduit 117 while the top sides of the pistons 29 are in fluid communication through the conduit 119. A conduit 121 connects the top sides of pistons 111. This conduit includes a valve 123 which is closed when traverse of the cutter is desired to prevent equalization of pressure on the top sides of pistons 111. A conduit 125 is connected to the conduit 121 and to the underside of the piston 29 in cylinder 25. The connection of conduit 125 to conduit 121 is made on the cylinder 61 side of valve 123 so that there is an exchange of fluid between the cylinders 61 and 25. The underside of piston 29 in kicker cylinder 27 is connected to the underside of a piston 127 in a reversing cylinder 129, which preferably is of the same construction as the cylinders heretofore referred to and is also shown in Fig. 1, by means of a conduit 131. The piston 127 has the usual rod 133 which carries an electrical reversing switch mechanism 135, of any suitable type. Variably spaced flanges 137 are threaded on left-hand and right-hand threaded portions of an adjusting screw 139 suitably journaled in the frame 1 and rotated by a handle 140. These flanges engage opposite ends of the switch mechanism 135 to actuate the reversing lever therein in a well known manner. A solenoid operated four-way valve 141 of conventional construction has its solenoids 141a and 141b electrically energized through the contacts 142a and 142b, respectively, in the switch 135. The valve 141 has pressure and suction conduits 143 and 145, respectively, connected to a pump 147 and these are selectively or alternately connected to the other two conduits 149 and 151 which connect the valve 141 to the top of piston 127 and to the conduit 121 on the cylinder 63 side of valve 123. A motor 153 is provided to drive the pump 147 as are electrical leads 155 having take-off leads 157 for the switch 135 and solenoids 141a and 141b. A switch 159 may be inserted in leads 155 to provide means for breaking the entire circuit. A metering valve 161 is in suction line 145 to control the rate of flow of fluid to the pump 147 and thus the speed of actuation of the cylinders.

With the four-way valve in the position shown in Fig. 6 and the valve 123 closed, pressure fluid flows from the pump 147 to the valve 141 and thence to the top side of piston 111 in cylinder 63 through the conduits 151 and 121. In the cylinder 129, pressure fluid is allowed to flow from the topside of the piston 127 through conduit 149 to the valve 141 and thence to the inlet of pump 147 at a rate controlled by the setting of valve 161. This removes the resistance of piston 127 and rod 133 to movement toward the right, i. e., movement wherein the switch mechanism 135 will eventually be carried into abutment with the stop screw 139 to close contacts 142a. Pressure fluid which acts on the underside of the piston 127 to move the latter to the right as viewed in Fig. 1 flows into cylinder 129 through conduit 131 as a result of the parallel connections of the undersides of the pistons 111 through conduit 117 and the topsides of pistons 29 through conduit 119 and the series connection of the topside of piston 111 in cylinder 61 to the underside of piston 29 in cylinder 25. As will be observed in Fig. 6, this arrangement results in the simultaneous actuation of the cylinders 61 and 25 with the retraction of the rods in cylinders 63 and 27. As a result of this, kicker 33 for cylinder 25 strikes the tire periphery at the same time as the rods 109 pivot the rocker plates 77 and 79 in a clockwise direction to move the cutter 49 to the right. The simultaneous operation of these forces on the tire and cutter results in an inclined straight groove in the tire periphery. This movement continues until the piston 127 and the rod 133 have advanced just beyond the position illustrated so that the switch 135 abuts the screw 139 to close contact 142a. This energizes the solenoid 141a and snaps the four-way valve 141 to a reverse position so that the conduit 149 is connected to the pressure line 143 and conduit 151 is connected to the suction line 145. As a result of this the cylinders 63 and 27 are actuated, the cylinders 61 and 25 are dumped and the piston rod 133 moves to left until the contacts 142b are closed to energize solenoid 141b and valve 141 to return the circuit to the position shown in Fig. 6.

This alternate and intermittent actuation of relative movement between the tire and cutter may be stopped at any time by opening the switch 159. If desired, the switch may be placed in a position adjacent to the side plate, as shown in Fig. 1, and a transverse trip rod 162 attached to the side plate 11 so that when the desired amount of rotary movement of the tire A has been completed the rod 162 strikes the switch 159 to open the circuit and cut off electrical power to the apparatus.

In case it is desired to have merely a circular groove in the tire A, the automatic transverse feed provided by cylinders 61 and 63 must be eliminated. This is accomplished by opening valve 123 in line 121. When this is done pressures on both sides of both pistons 111 are equalized so that the rods 109 occupy the same positions relative to the cylinders. It will be observed, however, from Fig. 6 that this does not interfere with the operation of the kicker cylinders 25 and 27 which continue to operate alternately to rotate the tire A.

When the cylinders 61 and 63 are cut out in this manner it is desirable to center the rocker plates 77 and 79 and attached mechanism. This may be accomplished as shown in Fig. 5 by means of a locating pin 163 which fits in a hole 165 in the rocker plates 77. The pin is slidably connected to the arm 67 by means of a slot and pin connection 167 and is yieldably biased upwardly out of the hole 165 by a spring 169 between its head and the surface of the arm 67. Transverse forces on the pin 163 are sufficient to bind the pin 163 in position in the locating hole 165.

Due to irregularities in the tire A it may happen that the groove being cut appears to be or about to be transversely out of line. In this situation, an operator may properly line up the cutter 49 and the desired groove by transversley moving the carriage bar 51 and attached structure through the medium of the handle 57 and lead screw 55. This does not interfere with the aforedescribed operation of the cylinders 61 and 63 if the conduits 151 and 117 are constructed of flexible material.

When the cutter 49 is moved transversely as by the cylinders 61 and 63 or the lead screw 55, there is a transverse force on the tire periphery which tends to move the tire sidewise. It is desirable to resist this tendency by support or centernig means located near the periphery of the tire. For this purpose, the crosshead 71 may be provided with longitudinal legs or end portions 171 as shown in Fig. 4 which parallel the tire edge. Transverse bars 173 are slidable in suitable apertures in the legs 171 and have longitudinal roller supporting arms 175 suitably connected thereto. The rollers 177 are rotatably mounted on the ends of arms 175 and are adapted to engage the side plates 11 and 15. Transverse lead screws 179 threadably extend through the legs 171 and are connected to the arms 175. Rotative knobs 181 are affixed to the outer ends of the screws 179 by means of which an operator may bring the rollers into contact with the side plates 11 and 15 to resist side thrust on the tire A.

The operation of the foregoing structure during the actual grooving of a tire has been explained in the foregoing description. When grooving is completed and it is desired to remove the tire A and replace it with another, the link 97 is moved so as to disengage the notches 107 and relieve the force of spring 105 on the plate 93 and crosshead 71. An operator may grasp the rod 87 and pivot the cutter carriage structure about the ends of cylinders 61 and 63 until the rollers 177 are clear of the tire A. The cutter carriage structure may be held in this upraised position by suitable means such as a pin or block (not shown) inserted or connected to the guide bar 95 on the underside of the plate 93 so that downward movement thereof is prevented. With the rollers 177 out of the way, the wing nut 17 may be unscrewed from the axle 7 and the side plate 15 removed. The tire A and cone 13 may then be removed and another tire placed on the axle 7. As mentioned hereinbefore, the tire is inflated on its rim and the cone 13 is inserted in the hub to axially center the tire on the axle 7. The tire is transversely positioned by side plate 11 whereupon side plate 15 and wing nut 17 are replaced. The cutter carriage and crosshead 71 are lowered so that the rollers 177 are in engagement with the side plates 11 and 15 and spring forces are again applied to the plate 93 by connecting a notch 107 of link 97 to the frame 1. After the cutter 49 is slid on rod 85 into the desired position and clamped there by block 89, the switch 159 may be closed to actuate the cylinders 61, 63, 25, and 27 as hereinbefore described.

It will be understood that aforedescribed structure is shown by way of illustration only and the invention is not to be limited thereto, since many modifications may be made without departing from the underlying principles and teachings of the invention as set forth.

What is claimed is:

1. A tire grooving machine comprising a frame having first means for supporting a tire for rotation about its axis, a carriage movably supported on the frame for movement transverse to the tire periphery, second means for moving the carriage transversely, a groove cutter, third means connecting the cutter to the carriage for movement relative thereto in a direction transverse to the tire, first pressure actuated means for intermittently applying rotative forces to a tire, second pressure actuated means connected to the third means for moving the cutter in opposite transverse directions relative to the carriage and tire, and synchronizing means interconnecting the pressure actuated means to actuate the same simultaneously and to actuate the second pressure actuated means to move the cutter alternately in opposite transverse directions.

2. In a tire-grooving machine, the combination of groove cutting means for engaging the periphery of a tire to be grooved and located on one side of a plane through the tire axis, power operated means for intermittently rotating a tire, said power operated means comprising a fluid pressure actuated reciprocatory kicker member engageable with the periphery of a tire on the same side of the tire as said groove cutting means but on the opposite side of a plane through the tire axis at right angles to said first plane whereby it rotates the tire into the cutting means, said kicker member being movable transversely with respect to the axis of such tire.

3. The invention set forth in claim 2 wherein said power operated means includes a valve for controlling the rate of flow of fluid pressure on the member.

4. A tire grooving machine comprising mounting means for rotatably supporting a tire to be grooved, an actuator carrying a groove cutter and operative to move the same in a series of cutting strokes alternately to the right and to the left across the periphery of said tire so that said cutter cuts a groove in the tire when moving both to the right and to the left, indexing mechanism for intermittently rotatably actuating said tire during said cutting strokes, means for synchronizing the cutting strokes of said cutter and indexing movement of said tire so that said tire is rotatably actuated simultaneously with and during said cutting strokes whereby said cutter makes a continuous zig-zag groove in the tire, and manually operable means for selectively controlling the amount of rotative movement imparted to the tire during each indexing operation so that the length of the zig-zag groove which the cutter makes in the tire can be selectively varied as the cutter progresses around the circumference of the tire.

5. A tire grooving machine comprising mounting means for rotatably supporting a tire to be grooved, an actuator carrying a groove cutter and operative to move the same in a series of cutting strokes alternately to the right and to the left across the periphery of said tire so that said cutter cuts a groove in the tire when moving both to the right and to the left, indexing mechanism for intermittently rotatably actuating said tire during said cutting strokes, means for synchronizing the cutting strokes of said cutter and indexing movement of said tire so that said tire is rotatably actuated simultaneously with and during said cutting strokes whereby said cutter makes a continuous zig-zag groove in the tire, and manually operable means for selectively and simultaneously controlling the amount of rotative movement imparted to the tire during each indexing operation and the length of said cutting strokes so that the longitudinal and transverse size of the zig-zag groove which the cutter makes in the tire can be regulated and varied as the cutter progresses around the circumference of the tire.

6. A tire grooving machine comprising mounting means for rotatably supporting a tire to be grooved, an actuator carrying a groove cutter and operative to move the same in a series of cutting strokes alternately to the right and to the left across the periphery of said tire so that said cutter cuts a groove in the tire when moving both to the right and to the left, indexing mechanism for intermittently rotatably actuating said tire during said cutting strokes, means for synchronizing the cutting strokes of said cutter and indexing movement of said tire so that said tire is rotatably actuated simultaneously with and during said cutting strokes whereby said cutter makes a continuous zig-zag groove in the tire, and control means for selectively operating said tire indexing means independently of said cutter actuating means.

7. In a tire-grooving machine, the combination of fluid pressure-operated means for intermittently rotating a tire and including a manually adjustable means for varying the amount of rotation imparted to the tire during each intermittent operation thereof, a carriage having mounting means thereon adapted to receive a groove cutter, means pivotally mounting the carriage so that a cutter on said mounting means is movable toward and away from the axis of the tire, said mounting means being movable so that a cutter mounted thereon moves substantially parallel to the axis of and transverse to the periphery of a tire, fluid pressure-operated reversible means for moving the mounting means so that the cutter moves back and forth across the periphery of the tire parallel to a tire axis and including a valve for controlling the flow of fluid pressure thereto, said reversible means also including bell cranks pivoted to the mounting means and having fixed pivots, and means for rocking the bell cranks about their pivots, said carriage including a pair of pressure cylinders pivoted on a common axis at one end to move toward and away from a tire and carrying said mounting means at their other ends and operatively connected to said mounting means to move the same and thus comprise said reversible means, and means synchronizing the intermittent rotating means and the cutter-moving means so that the tire is rotatably actuated each time the cutter is moved in either direction with respect to the periphery of the tire whereby a continuous zigzag groove is cut in the tire.

8. A tire-grooving machine comprising mounting means for rotatably supporting a tire to be grooved, an actuator carrying a groove cutter and operable to move the same in a series of cutting strokes alternately to the right and to the left across the periphery of said tire so that said cutter cuts a groove in the tire when moving both to the right and to the left, indexing mechanism for intermittently rotatably actuating said tire during said cutting strokes, means for synchronizing the cutting strokes of said cutter and indexing movement of said tire so that said tire is rotatably actuated simultaneously with and during said cutting strokes, whereby said cutter makes a continuous zigzag groove in the tire, and manually operable means for selectively varying the extent of the synchronizing means during each indexing operation so that the character of the zigzag groove can be selectively varied.

References Cited in the file of this patent

UNITED STATES PATENTS

| | | |
|---|---|---|
| 2,000,129 | Dunnam | May 7, 1935 |
| 2,116,512 | Ericson | May 10, 1938 |
| 2,130,627 | Kelly | Sept. 20, 1938 |
| 2,192,130 | Errig et al. | Feb. 27, 1940 |
| 2,225,041 | Edinger | Dec. 17, 1940 |
| 2,362,967 | Bivans | Nov. 21, 1944 |